United States Patent
Lauz et al.

(10) Patent No.: US 11,961,084 B1
(45) Date of Patent: Apr. 16, 2024

(54) MACHINE LEARNING MODELS FOR FRAUD DETECTION

(71) Applicant: RSA Security LLC, Bedford, MA (US)

(72) Inventors: Adam Lauz, Kfar Kama (IL); Anna Belogolovski, Kokhav Yair (IL)

(73) Assignee: RSA Security LLC, Bedford, MA (US)

( * ) Notice: Subject to any disclaimer, the term of this patent is extended or adjusted under 35 U.S.C. 154(b) by 86 days.

(21) Appl. No.: 17/532,309

(22) Filed: Nov. 22, 2021

(51) Int. Cl.
*G06Q 40/00* (2023.01)
*G06F 18/214* (2023.01)
*G06N 20/00* (2019.01)
*G06Q 20/40* (2012.01)

(52) U.S. Cl.
CPC ....... *G06Q 20/4016* (2013.01); *G06F 18/214* (2023.01); *G06N 20/00* (2019.01)

(58) Field of Classification Search
CPC ... G06Q 20/4016; G06N 20/00; G06F 18/214
See application file for complete search history.

(56) References Cited

U.S. PATENT DOCUMENTS

| | | | | |
|---|---|---|---|---|
| 5,819,226 | A * | 10/1998 | Gopinathan | G06Q 20/40 705/44 |
| 10,467,403 | B1 * | 11/2019 | Blatt | G06F 21/577 |
| 10,867,303 | B1 * | 12/2020 | Manapat | G06Q 10/067 |
| 11,276,023 | B1 * | 3/2022 | Butler | G06Q 20/4016 |
| 11,620,652 | B1 * | 4/2023 | Manapat | G06Q 20/4016 705/44 |
| 2009/0106178 | A1 * | 4/2009 | Chu | G06N 5/02 706/14 |
| 2017/0083920 | A1 * | 3/2017 | Zoldi | G06N 20/00 |
| 2017/0148027 | A1 * | 5/2017 | Yu | G06Q 10/0635 |
| 2019/0102361 | A1 * | 4/2019 | Muralidharan | G06F 11/302 |
| 2019/0392351 | A1 * | 12/2019 | Zuluaga | G06N 20/20 |
| 2020/0175388 | A1 * | 6/2020 | Hu | G06Q 20/40 |
| 2022/0006899 | A1 * | 1/2022 | Phatak | G06N 20/00 |

FOREIGN PATENT DOCUMENTS

| | | | | |
|---|---|---|---|---|
| WO | WO-2019172887 A1 * | 9/2019 | | G06N 20/00 |
| WO | WO-2020106806 A1 * | 5/2020 | | G06N 20/00 |
| WO | WO-2022015488 A1 * | 1/2022 | | G06Q 10/04 |

OTHER PUBLICATIONS

Lanier, "Choosing Performance Metrics—Accuracy, Sensitivity vs Specificity, Precision vs Recall, and F1 Score," Towards Data Science, 2020 (Year: 2020).*

(Continued)

*Primary Examiner* — Abhishek Vyas
*Assistant Examiner* — William B. Bunker
(74) *Attorney, Agent, or Firm* — Danielson Legal LLC

(57) ABSTRACT

Machine learning models for fraud detection. The method includes receiving a schedule of weights, the schedule comprising a plurality of entries, each entry comprising a transaction value weight, a transaction volume weight, and a range of intervention rates; testing the at least one machine learning model using a holdout data set, resulting in a ranked transactions data set; and evaluating the performance of the at least one machine learning model by computing the weighted harmonic mean of the ranked transactions data set using the schedule of weights.

14 Claims, 4 Drawing Sheets

(56) References Cited

OTHER PUBLICATIONS

Bannerjee et al., "Comparative Analysis of Machine Learning Algorithms through Credit Card Detection," IEEE, 978-1-5388-9374-2/18 2018 (Year: 2018).*
Bentivegna, Precision vs. Recall—Evaluating Model Performance in Credit Card Fraud Detection, Towards Data Science, 2020 (Year: 2020).*
Thapa, "Credit Card Fraud Detection: Choosing the Right Metrics for Model," Analytics Vidhya, 2020 (Year: 2020).*
Kumar et al., "Comparative Analysis for Fraud Detection Using Logistic Regression, Random Forest, and Support Vector Machine," www.ijrar.org, 2020 (Year: 2020).*

* cited by examiner

US 11,961,084 B1

MACHINE LEARNING MODELS FOR FRAUD DETECTION

TECHNICAL FIELD

The present application relates generally to machine learning models for fraud detection and, more particularly but not exclusively, to evaluation functions for such models.

BACKGROUND

Machine learning algorithms may construct models to receive a set of current inputs. Often times, however, the constructed models are evaluated using imperfect metrics or only a single metric.

For example, existing fraud detection models constructed using machine learning algorithms are evaluated using metrics such as the number of fraudulent transactions detected or the financial value of fraudulent transactions detected. Using a single, discrete metric to evaluate models results in models that are optimized for that metric, such that the models often outperform on one metric while underperforming on other potentially relevant metrics. This tradeoff results in models that are suboptimal for their intended purposes.

A need therefore exists for improved machine learning models for fraud detection.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method. The method including receiving a schedule of weights, the schedule comprising a plurality of entries, each entry comprising a transaction value weight, a transaction volume weight, and a range of intervention rates; training at least one machine learning model to detect fraud using a training data set; testing at least one machine learning model using a holdout data set, resulting in a ranked transactions data set; and evaluating the performance of the at least one machine learning model by computing the weighted harmonic mean of the ranked transactions data set using the schedule of weights.

In some embodiments, the data sets comprise monetary transactions, and the monetary transactions in the holdout data set are more recent than the monetary transactions in the training data set.

In some embodiments, the method includes generating additional machine learning models when the computed weighted harmonic mean does not exceed a threshold.

In some embodiments, the weights are absolute values.

In some embodiments, the weights are relative values.

In some embodiments, the method further includes training the at least one machine learning model to detect fraud using a training data set.

According to another aspect, embodiments relate to an apparatus. The apparatus including at least one processing device comprising a processor coupled to a memory; the at least one processing device being configured to implement the following steps: receiving a schedule of weights, the schedule comprising a plurality of entries, each entry comprising a transaction value weight, a transaction volume weight, and a range of intervention rates; testing at least one machine learning model using a holdout data set, resulting in a ranked transactions data set; and evaluating the performance of the at least one machine learning model by computing the weighted harmonic mean of the ranked transactions data set using the schedule of weights.

In some embodiments, the data sets comprise monetary transactions, and the monetary transactions in the holdout data set are more recent than the monetary transactions in the training data set.

In some embodiments, the at least one processing device is further configured to generate additional machine learning models when the weighted computed harmonic mean does not exceed a threshold.

In some embodiments, the weights are absolute values.

In some embodiments, the weights are relative values.

In some embodiments, the at least one processor is further configured to train the at least one machine learning model to detect fraud using a training data set.

According to another aspect, embodiments relate to a non-transitory computer readable storage medium containing computer-executable instructions for a method. The medium includes computer-executable instructions for receiving a schedule of weights, the schedule comprising a plurality of entries, each entry comprising a transaction value weight, a transaction volume weight, and a range of intervention rates; computer-executable instructions for testing the at least one machine learning model using a holdout data set, resulting in a ranked transactions data set; and computer-executable instructions for evaluating the performance of the at least one machine learning model by computing the weighted harmonic mean of the ranked transactions data set using the schedule of weights.

In some embodiments, the medium further includes computer-executable instructions for training the at least one machine learning model to detect fraud using a training data set.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
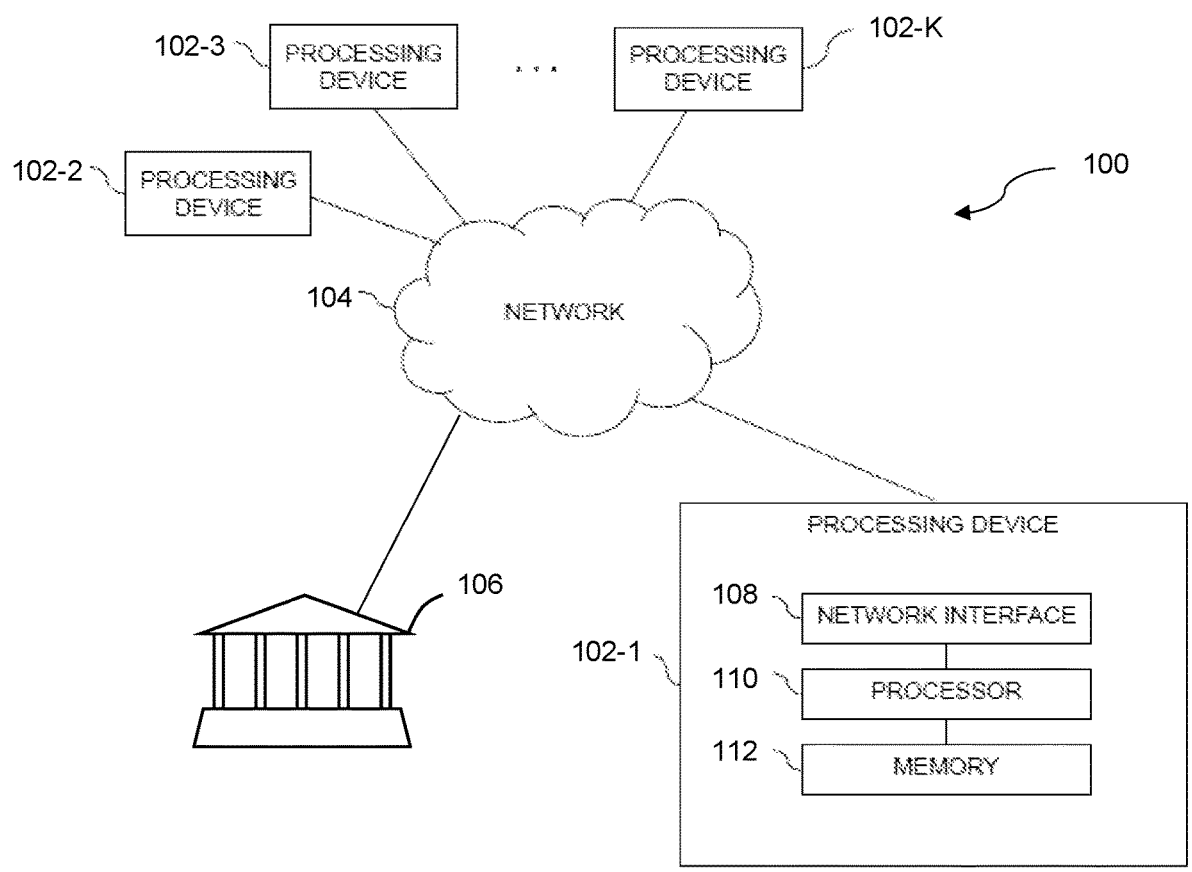
FIG. 1 illustrates an exemplary processing platform for generating fraud detection models that may be used to implement at least a portion of one or more embodiments of the disclosure.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on nontransient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Machine learning procedures are used to construct models that provide an output based on a current set of inputs. In supervised machine learning, algorithms analyze a training set of data to generate a model, and use a holdout dataset to evaluate the performance of the generated model. A holdout dataset represents future inputs from the model's point of view, and is fully separated from the data used to generate the model.

For example, k-fold cross validation is a technique in which a dataset is partitioned into k sections, and k−1 sections are used to train a model. One section serves as holdout data (i.e., not used to generate the model). The generated model may then be tested on the holdout section. In temporal datasets, such as those involving monetary transactions, the holdout data is typically more recent than the training data.

To assess the model's accuracy, these techniques generally execute an evaluation function that outputs a numeric score for a model based on its performance. In some applications, this numeric score is often a business-oriented metric and may involve monetary elements.

The embodiments described herein provide novel techniques for evaluating models on holdout dataset performance. Specifically, the embodiments herein provide techniques for improving evaluation functions. These embodiments may be applied in a number of applications, including those involved in detecting fraudulent transactions.

Fraud detection models may detect fraud occurring in monetary or other types of transactions. For example, an unsuspecting bank customer may have their credentials stolen through a data breach, and malicious actors may then attempt to use the customer's credentials to conduct fraudulent transactions.

Remedying or otherwise addressing fraud can be a costly and time consuming endeavor, and preventing fraud can save large amounts of resources. Banks often provide chargebacks to victimized customers. These chargebacks are typically for the amount that was stolen or otherwise misappropriated from the customer, and can be hundreds or thousands of dollars. Detecting, and more importantly preventing, fraud can therefore save banks or other types of financial institutions a significant amount of money.

Preventing fraud can also increase the trust that users or customers have in their financial service providers. If a customer is confident that their bank will protect them from fraud, they may be willing to keep more money with the bank and use more of the bank's services.

Fraud detection models may be built using machine learning algorithms or statistical-based approaches. These approaches tune a set of parameters to provide the "best" performing model. However, the model is only the "best" in the sense that it maximizes the value of the function used to evaluate it. An evaluation function that, e.g., maximized fraudulent transactions, would result in a "best" model completely unsuited for its intended purpose.

There are multiple relevant parameters in fraud analysis. One parameter is the Fraud Detection Rate, which is also referred to as the sensitivity or recall. The Fraud Detection Rate (for simplicity, "FDR") measures the percentage of fraud that is captured out of all existing fraud.

FDR can be represented in terms of volume or in value. FDR in terms of volume refers to the number of detected fraudulent transactions out of all fraudulent transactions. FDR in terms of value refers to the amount of money or value associated with detected fraudulent transactions out of the total money or value associated with all fraudulent transactions.

Another parameter related to fraud analysis is the Intervention Rate. The Intervention Rate (for simplicity, "IR") is the measure of the "friction" of the system with its users, and can be defined as the percentage of transactions that are interrupted or halted by the system. Ideally, the IR is kept as low as possible while the FDR is as high as possible. A high IR may indicate the system is highly and, perhaps unnecessarily, sensitive to possible fraud. Systems with a high IR may ultimately halt transactions that do not need to be halted, which can cause confusion or at the very least annoy users or other parties to a transaction.

To exemplify these parameters, suppose a holdout dataset has 1,000 entries. Of the 1,000 entries, there are 150 fraudulent transactions and 850 non-fraudulent transactions. Each generated model may be configured differently and produce different FDRs and TRs upon evaluating the holdout data.

For example, a first model may have a high FDR in that it detects 147 of the 150 fraudulent transactions (FDR=~97%). This first model may also have a high IR in that it classifies 600 of the total transactions as fraudulent (IR=60%). This is an undesirably high IR, as 60% of the transactions would be halted when only a relatively small amount of transactions are actually fraudulent.

As another example, a second model may classify all 150 fraudulent transactions as fraudulent, thereby achieving an FDR of 1 (100%). The second model may also classify 175 of the total transactions as fraudulent, in which case IR=17.5%. Considering this data alone, the second model would be more desirable than the first model. As discussed above, the embodiments herein can consider this FDR in terms of value and volume.

The optimal point of a model is where FDR=1 (i.e., all fraud is detected), and where:

$$\text{Intervention Rate}(IR) = \frac{|D_F|}{|D|}$$

where $D_F$ is all existent fraud, and D is all data. In other words, the optimal IR is one in which all existent fraud is detected, and only the actual fraudulent transactions are classified as fraudulent (i.e., there are no false positives). However, in practice, a model's IR will be higher than this optimal IR. This is because a model will likely classify some non-fraudulent transactions as fraudulent and will have a higher-than-optimal IR.

Existing techniques analyze FDR at particular intervention rates. These models or techniques, however, only partially measure system performance. For example, these existing models will typically emphasize or measure only the FDR in volume, but not in terms of value. Or, an existing model will emphasize or measure only the FDR in value but not in terms of volume. Accordingly, these types of models have biased performances that tend to optimize one parameter while ignoring the other.

The embodiments herein combine the above metrics to detect the FDR at a range of intervention rates i (e.g., 1%-5%), represented as FDR@i. FDR@i can be measured in terms of volume (FDR@$i_{volume}$) or in terms of value (FDR@$i_{value}$). FIG. 1 illustrates an exemplary processing platform for generating fraud detection models that may be used to implement at least a portion of one or more embodiments of the disclosure. The platform may include a system 100 that comprises a plurality of processing devices, denoted 102-1, 102-2, 102-3, . . . , 102-K, which communicate with one another over one or more networks 104.

The network(s) 104 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 104 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The network(s) 104 may also include or otherwise be in communication with one or more institutions 106 such as banks, clearing houses, brokerage firms, credit reporters, merchants, ecommerce service providers, or the like. Accordingly, one or more processing devices 102 can monitor and analyze transaction data associated with these types of institutions or its customers.

The processing device 102-1 in the system 100 may comprise a network interface 108 and a processor 110 coupled to a memory 112. The processor 110 may comprise a microprocessor, a microcontroller, an application specific integrated circuit (ASIC), a field programmable gate array (FPGA) or other type of processing circuitry, as well as portions or combinations of such circuitry elements, and the memory 112, which may be viewed as an example of a "processor-readable storage media" storing executable program code of one or more software programs. The other processing devices 102-2, etc. are assumed to be configured in a manner similar to that shown for processing device 102-1.

The network interface 108 may interface the processing device 102-1 with the network 104 and other system components, and may comprise conventional transceivers. The memory 112 may be L1, L2, L3 cache, or RAM memory configurations. The memory 112 may include non-volatile memory such as flash memory, EPROM, EEPROM, ROM, and PROM, or volatile memory such as static or dynamic RAM, as discussed above. The exact type of memory 112 may of course vary as long as instructions for optimizing an evaluation function can be executed by the processor 110 to accomplish the objectives of the embodiments described herein.

Figure 2:
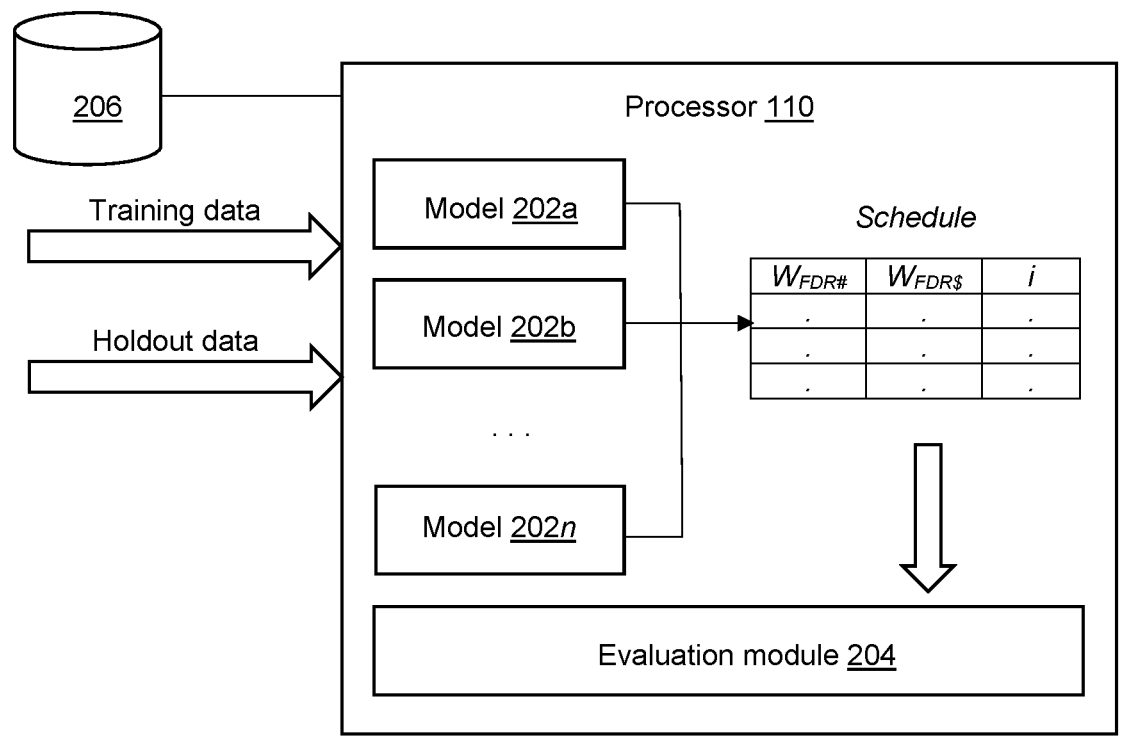
FIG. 2 illustrates the processor of FIG. 1 in accordance with one embodiment.

The processor 110 may execute instructions stored on the memory 112 to provide various modules to accomplish the features of the embodiments herein. For example, FIG. 2 illustrates the processor 110 of FIG. 1 in accordance with one embodiment. During a training phase, one or more models 202a, 202b, . . . 202n are trained on a set of training data. The training set of data may include labeled instances of known fraudulent transactions and known non-fraudulent transactions, as well as other characteristics of each transaction that are indicative of whether or not the transaction is fraudulent.

The embodiments herein may train the models using any one or more of supervised learning techniques. These may include, but are not limited to, logistic regression models, neural networks, random forests, or the like. The exact type(s) of models generated and the techniques by which they are generated may vary as long as they can be tested on holdout data to accomplish the features of the embodiments described herein.

The generated models may then each be tested on the holdout data and each test will output an IR and an FDR. Highly sensitive models will classify more transactions as fraudulent and therefore have a higher IR than less sensitive models.

Each execution instance of each model may use a certain weight for the FDR for volume ($W_{FDR\#}$) and a certain weight for FDR for value ($W_{FDR\$}$) for evaluating the model. In some embodiments, a single model may be executed multiple times, wherein each execution instance has different weight values.

Each execution may output an IR that represents the number of transactions in the holdout data that the associated model flagged as fraudulent. As seen in FIG. 2, a schedule of entries may be provided to an evaluation module 204. Each entry of the schedule may include a $W_{FDR\#}$, $W_{FDR\$}$, and the range of intervention rates IR that was achieved by a particular model using those weight values. The schedule may include multiple entries that are associated with evaluating a single model, albeit with different weights.

The evaluation module 204 may use the FDR@i metric discussed above, which combines the volume and value aspects of the captured fraud. For example, an administrator or other type of user may prefer to give more weight on the fraud captured in terms of monetary value and to focus on a specific range of IR.

The evaluation module 204 may use the weighted harmonic mean WH as represented by Eq. 1, below:

$$WH(\{x_i | i = 1, \ldots, n, w_1, \ldots, w_n\}) = \frac{\sum_{i=1}^{n} w_i}{\sum_{i=1}^{n} \left(\frac{w_i}{x_i}\right)} \quad \text{Eq. 1}$$

For a given model, or for various settings of a given model, the embodiments herein may compute the weighted harmonic mean of the FDR in terms of volume # at a range of intervention rates i (FDR #@i) and the weighted harmonic mean of the FDR in terms of value $ at a range of intervention rates i (FDR$@i) using Eq. 2:

$$WH(FDR\#@i, FDR\$@i | W_{FDR\#}, W_{FDR\$}) = \frac{w_{FDR\#} + w_{FDR\$}}{\frac{w_{FDR\#}}{FDR\#@i} + \frac{w_{FDR\$}}{FDR\$@i}} \quad \text{Eq. 2}$$

That is, a user may select models that produce a certain intervention rate i or produce an intervention rate i that is within a certain range, and note the FDR #@i and the FDR$@i. The various weighting values $W_{FDR\#}$, $W_{FDR}\$$ at a given i may be obtained from the schedule in FIG. 2.

Then, the evaluation module 204 may compute the harmonic mean of WH(FDR #@i, FDR$@i) across a range of intervention rates i:

$$WH(\{WH(FDR \#@i, FDR\$@i | W_{FDR\#}, W_{FDR\$}) | i = 1\%, \ldots, n\%, w_{1\%}, \ldots, w_{n\%}\}) \quad \text{Eq. 3}$$

The weights in Eq. 3 can be adjusted to shift the focus on $W_{FDR\#}$ or $W_{FDR}\$$ according to individual preferences. For example, one application can focus on certain i values, and put more weight on the FDR$ or FDR # at those i values. Accordingly, the weighted harmonic mean allows for the optimization of all involved parameters at the same time while controlling the focus in terms of volume-value and across a range of intervention rates.

The embodiments herein therefore provide a number of advantages over existing techniques. For example, the embodiments herein provide a single score that combines fraud detection in volume, fraud detection in value and across a range of intervention rates. This enables the system 100 to fully automate the model generation process.

The weights can be used to determine the importance of the volume or value metrics across a range of intervention rates. Using the weighted harmonic mean allows a user to favor the increase of all components, as opposed to an arithmetic mean where the metric can be relatively high if one component is large, but the others are smaller.

Figure 3:
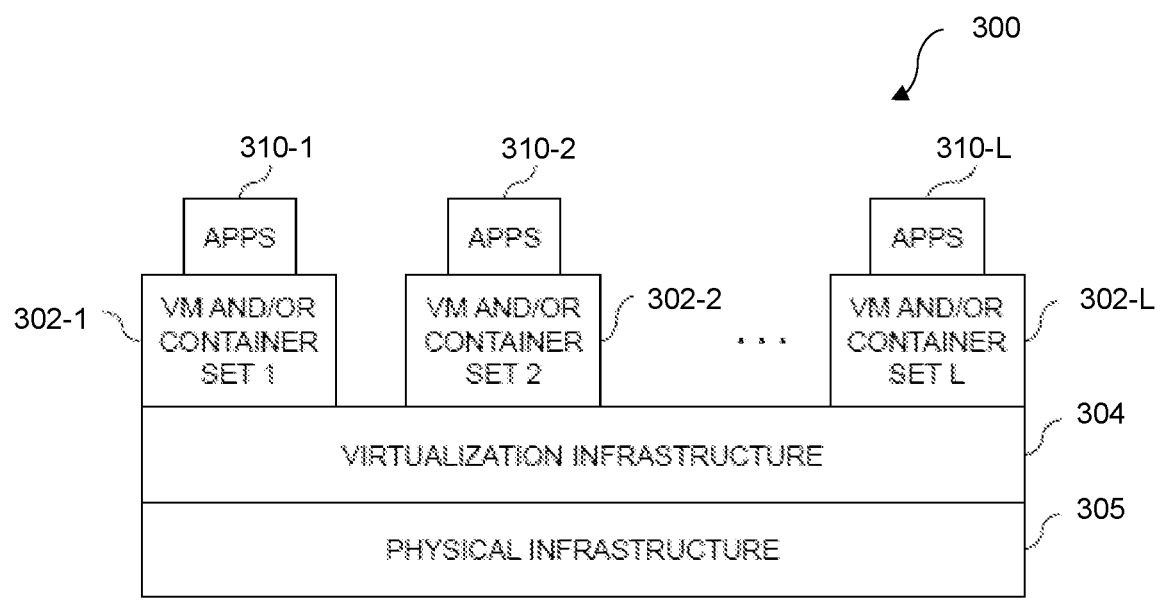
FIG. 3 illustrates an exemplary processing platform comprising a cloud infrastructure that may be used to implement least a portion of one or more embodiments of the disclosure.

FIG. 3 illustrates an exemplary processing platform comprising a cloud infrastructure 300 that may be used to implement at least a portion of one or more embodiments of the disclosure. The cloud infrastructure 300 comprises a combination of physical and virtual processing resources that may be utilized to implement at least a portion of the system 100 of FIG. 1. The cloud infrastructure 300 comprises multiple virtual machines (VMs) and/or container sets 302-1, 302-2, . . . 302-L implemented using virtualization infrastructure 304.

The virtualization infrastructure 304 runs on physical infrastructure 305, and illustratively comprises one or more hypervisors and/or operating system level virtualization infrastructure. The operating system level virtualization infrastructure 304 illustratively comprises kernel control groups of a Linux operating system or other type of operating system.

The cloud infrastructure 300 further comprises sets of applications 310-1, 310-2, . . . , 310-L running on respective ones of the VMs/container sets 302-1, 302-2, . . . 302-L under the control of the virtualization infrastructure 304. The VMs/container sets 302 may comprise respective VMs, respective sets of one or more containers, or respective sets of one or more containers running in VMs.

In some implementations of the embodiment shown in FIG. 3, the VMs/container sets 302 comprise respective VMs implemented using virtualization infrastructure 304 that comprises at least one hypervisor. Such implementations can provide the evaluation function optimization functionality described above for one or more processes running on a given one of the VMs. For example, each of the VMs can implement logic for training, executing, and analyzing models.

An example of a hypervisor platform that may be used to implement a hypervisor within the virtualization infrastructure 304 is the VMware® vSphere® which may have an associated virtual infrastructure management system such as the VMware® vCenter™. The underlying physical machines may comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system. Such implementations can provide the evaluation function optimization functionality of the type described above for one or more processes running on different ones of the containers. For example, a container host device supporting multiple containers of one or more container sets can implement one or more instances of evaluation control logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 300 shown in FIG. 3 may represent at least a portion of one processing platform.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

The embodiments illustrates in FIGS. 1 and 3 shown in the figures are presented by way of example only, and the given system 100 may include additional or alternative processing platforms, as well as numerous distinct processing platforms in any combination, with each such platform comprising one or more computers, storage devices or other processing devices.

Multiple elements of the system 100 may be collectively implemented on a common processing platform of the type shown in FIG. 1 or 3, or each such element may be implemented on a separate processing platform. For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs. As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible to accomplish the features of the disclosed embodiments. Such components can communicate with other elements of the system over any type of network or other communication media The particular processing operations and other network functionality described in conjunction with FIGS. 1-4 are presented by way of illustrative example only, and should not be construed as limiting the scope of the disclosure in any way. Alternative embodiments can use other types of processing operations to perform the model generation steps discussed above. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for generating machine learning models to detect fraud. The foregoing applications and associated embodiments should be considered as illustrative only, and numerous other embodiments can be configured using the techniques disclosed herein, in a wide variety of different applications.

It should also be understood that the disclosed model generation techniques, as described herein, can be implemented at least in part in the form of one or more software programs stored in memory and executed by a processor of a processing device such as a computer. A memory or other storage device having such program code embodied therein is an example of what is more generally referred to herein as a "computer program product."

The disclosed techniques for generating machine learning models for fraud detection may be implemented using one or more processing platforms. One or more of the processing modules or other components may therefore each run on a computer, storage device, or other processing platform element. A given such element may be viewed as an example of what is more generally referred to herein as a "processing device."

In these and other embodiments, compute services can be offered to cloud infrastructure tenants or other system users as a Platform-as-a-Service (PaaS) offering, although numerous alternative arrangements are possible. Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based keystroke analysis engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based keystroke analysis platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Figure 4:
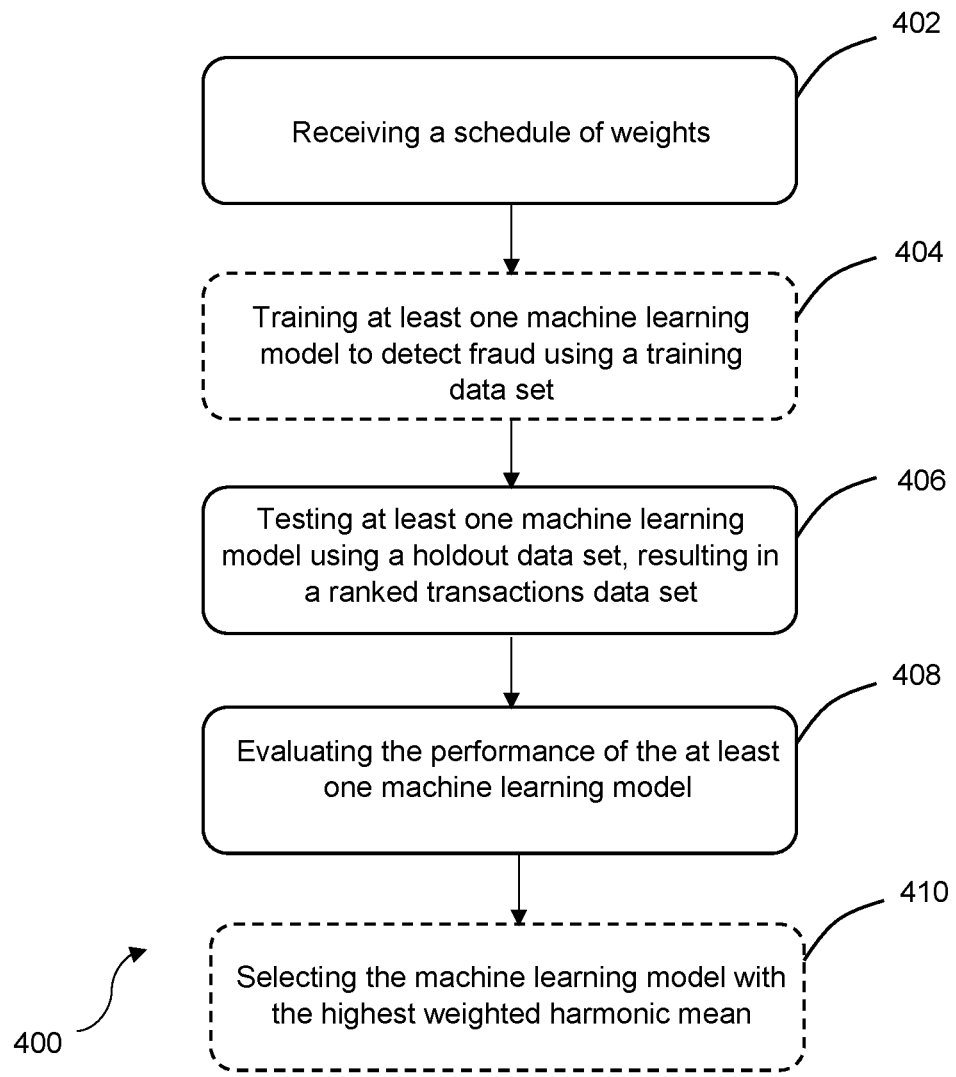
FIG. 4 depicts a flowchart of a method in accordance with one embodiment.

FIG. 4 depicts a flowchart of a method 400 in accordance with one embodiment. Step 402 involves receiving a schedule of weights, the schedule comprising a plurality of entries, each entry comprising a transaction value weight, a transaction volume weight, and a range of intervention rates. The schedule may be similar to the schedule of FIG. 2, for example.

Step 404 is optional and involves training at least one machine learning model to detect fraud using a training data set. The embodiments described herein may use any one or more of supervised learning techniques to generate machine learning models. These may include, but are not limited to, logistic regression models, neural networks, random forests, or the like. The exact types of models generated and the techniques by which they are generated may vary as long as they can be tested on holdout data to accomplish the features of the embodiments described herein. In some embodiments, the machine learning models may be generated by a separate entity.

Step 406 involves testing the at least one machine learning model using a holdout data set, resulting in a ranked transactions data set. The purpose of step 406 is to measure the performance of each generated model to determine how well each model detects some class, such as fraudulent transactions discussed above.

Step 408 involves evaluating the performance of the at least one machine learning model by computing the weighted harmonic mean of the ranked transactions data set using the schedule of weights. As discussed previously, existing techniques use imperfect metrics such as, in the case of fraud detection, using only the number of transactions that are flagged or the dollar volume of the transactions that are flagged.

Step 408, on the other hand, involves using Eq. 3 as an evaluation function that assigns weights to each FDR metric. The result is a single value that allows a user to compare multiple models.

Step 410 is optional and involves selecting the machine learning model with the highest harmonic mean for the received schedule of weights. That is, a user may select, or the system may autonomously select the model that produces the highest value as determined by Eq. 3 above. For example, the system may replace a first model if the weighted harmonic mean of a different or new model exceeds the weighted harmonic mean of the first model.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for selecting a machine learning model from among a plurality of models for detecting fraud in payment card transactions, the method comprising:

providing a processing platform comprising one or more processors for training, testing, and evaluating a first plurality of models, wherein the platform is in electronic communication via a digital network with third party computing devices using one or more of the plurality of models to detect fraud, wherein each of the plurality of models has been trained to detect fraud based on features of the transactions that relate to both the value of the transactions and the volume of the transactions;

receiving, by the processing platform, a first schedule of weights, the schedule comprising a plurality of entries, each entry comprising a transaction value weight for a fraud detection rate in terms of value and a transaction volume weight for a fraud detection rate in terms of volume;

testing, by the processing platform, each of the first plurality of machine learning models on a holdout data set using the received schedule of weights wherein each testing instance results in an output of a fraud detection rate (FDR) and an intervention rate (IR) achieved using a combination of a transaction value weight and a transaction volume weight for each entry of the plurality of entries, wherein the platform tests each model for a plurality of testing instances with varying entries from the received first schedule;

identifying, for each testing instance, an IR for each entry of the combination of transaction value weight and transaction volume weight;

generating, by the processing platform, a second schedule of IR for each testing instance and for each model of the first plurality of models, wherein each instance of IR corresponds to the combination of transaction volume weight and transaction value weight as given in the first schedule;

selecting, by the processing platform, a second plurality of models from among the first plurality of models based on the second schedule, wherein the selecting is based on a user's preferred range of IR;

evaluating, by the processing platform, the performance of the second plurality of machine learning models by computing the weighted harmonic mean of the FDR using the second schedule of weights and over the selected range of IR;

selecting at least one machine learning model for detecting fraud, wherein the at least one machine learning model is selected based on the computed weighted harmonic mean;

receiving, by the processing platform, over the electronic network, a transaction for fraud analysis; and determining, by the processing platform, using the selected at least one machine learning model, whether the transaction is fraudulent.

2. The method of claim 1, wherein the data sets comprise monetary transactions, and the monetary transactions in the holdout data set are more recent than the monetary transactions in the training data set.

3. The method of claim 1, further comprising generating additional machine learning models when the computed weighted harmonic mean does not exceed a threshold.

4. The method of claim 1, wherein the weights are absolute values.

5. The method of claim 1, wherein the weights are relative values.

6. The method of claim 1, further comprising training the at least one machine learning model to detect fraud using a training data set.

7. An apparatus for selecting a machine learning model from among a plurality of models for detecting fraud in payment card transactions, the apparatus comprising:

a processing platform comprising one or more processors coupled to a memory for training, testing, and evaluating a first plurality of models, wherein the platform is in electronic communication via a digital network with third party computing devices using one or more of the plurality of models to detect fraud, wherein each of the plurality of models has been trained to detect fraud based on features of the transactions that relate to both the value of the transactions and the volume of the transactions;

the one or more processors being configured to implement the following steps:

receiving, by the processing platform, a first schedule of weights, the schedule comprising a plurality of entries, each entry comprising a transaction value weight for a fraud detection rate in terms of value, and a transaction volume weight for a fraud detection rate in terms of volume;

testing, by the processing platform, each of the first plurality of machine learning models on a holdout data set using the received schedule of weights wherein each testing instance results in an output of a fraud detection rate (FDR) and an intervention rate (IR) achieved using a combination of a transaction value weight and a transaction volume weight for each entry of the plurality of entries, wherein the platform tests each model for a plurality of testing instances with varying entries from the received first schedule;

identifying, for each testing instance, an IR for each entry of the combination of transaction value weight and transaction volume weight;

generating, by the processing platform, a second schedule of IR for each testing instance and for each model of the first plurality of models, wherein each instance of IR corresponds to the combination of transaction volume weight and transaction value weight as given in the first schedule;

selecting, by the processing platform, a second plurality of models from among the first plurality of models based on the second schedule, wherein the selecting is based on a user's preferred range of IR;

evaluating, by the processing platform, the performance of the second plurality of machine learning models by computing the weighted harmonic mean of the FDR using the second schedule of weights and over the selected range of IR;

selecting at least one machine learning model for detecting fraud, wherein the at least one machine learning model is selected based on the computed weighted harmonic mean;

receiving, by the processing platform, over the electronic network, a transaction for fraud analysis; and determining, by the processing platform, using the selected at least one machine learning model, whether the transaction is fraudulent.

8. The apparatus of claim 7, wherein the data sets comprise monetary transactions, and the monetary transactions in the holdout data set are more recent than the monetary transactions in the training data set.

9. The apparatus of claim 7, wherein the at least one processing device is further configured to generate additional machine learning models when the weighted computed harmonic mean does not exceed a threshold.

10. The apparatus of claim 7, wherein the weights are absolute values.

11. The apparatus of claim 7, wherein the weights are relative values.

12. The apparatus of claim 7 wherein the at least one processor is further configured to train the at least one machine learning model to detect fraud using a training data set.

13. A non-transitory computer readable storage medium containing computer-executable instructions for selecting a machine learning model from among a plurality of models for detecting fraud in payment card transactions, the medium comprising:

computer-executable instructions for providing a processing platform comprising one or more processors for training, testing, and evaluating a first plurality of models, wherein the platform is in electronic communication via a digital network with third party computing devices using one or more of the plurality of models to detect fraud, wherein each of the plurality of models has been trained to detect fraud based on features of the transactions that relate to both the value of the transactions and the volume of the transactions;

computer-executable instructions for receiving, by the processing platform, a first schedule of weights, the schedule comprising a plurality of entries, each entry comprising a transaction value weight for a fraud detection rate in terms of value and a transaction volume weight for a fraud detection rate in terms of volume;

computer-executable instructions for testing, by the processing platform, each of the first plurality of machine learning models on a holdout data set using the received schedule of weights wherein each testing instance results in an output of a fraud detection rate (FDR) and an intervention rate (IR) achieved using a combination of a transaction value weight and a transaction volume weight for each entry of the plurality of entries, wherein the platform tests each model for a plurality of testing instances with varying entries from the received first schedule;

computer-executable instructions for identifying, for each testing instance, an IR for each entry of the combination of transaction value weight and transaction volume weight;

computer-executable instructions for generating, by the processing platform, a second schedule of IR for each testing instance and for each model of the first plurality of models, wherein each instance of IR corresponds to the combination of transaction volume weight and transaction value weight as given in the first schedule;

computer-executable instructions for selecting, by the processing platform, a second plurality of models from among the first plurality of models based on the second schedule, wherein the selecting is based on a user's preferred range of IR;

computer-executable instructions for evaluating, by the processing platform, the performance of the second plurality of machine learning models by computing the weighted harmonic mean of the FDR using the second schedule of weights and over the selected range of IR; and computer-executable instructions for selecting at least one machine learning model for detecting fraud, wherein the at least one machine learning model is selected based on the computed weighted harmonic mean;

computer-executable instructions for receiving, by the processing platform, over the electronic network, a transaction for fraud analysis; and computer-executable instructions for determining, by the processing platform, using the selected at least one machine learning model, whether the transaction is fraudulent.

14. The non-transitory computer readable storage medium of claim 13 further comprising computer-executable instructions for training the at least one machine learning model to detect fraud using a training data set.

* * * * *